United States Patent
Grieb et al.

(10) Patent No.: US 10,902,179 B2
(45) Date of Patent: Jan. 26, 2021

(54) MODIFICATION OF FILE GRAPHIC APPEARANCE WITHIN A COLLECTION CANVAS

(71) Applicant: Microsoft Corporation, Redmond, WA (US)

(72) Inventors: Doreen N. Grieb, Kirkland, WA (US); Jaimin K. Gandhi, Redmond, WA (US); Samantha S. Yang, St. Louis, MO (US); Aaron Jady Hartwell, Duvall, WA (US); Matthew Kotler, Sammamish, WA (US); Erez Kikin-Gil, Bellevue, WA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 28 days.

(21) Appl. No.: 13/710,022

(22) Filed: Dec. 10, 2012

(65) Prior Publication Data
US 2014/0164886 A1 Jun. 12, 2014

(51) Int. Cl.
G06F 3/0481 (2013.01)
G06F 40/10 (2020.01)
G06F 3/0482 (2013.01)

(52) U.S. Cl.
CPC ............ *G06F 40/10* (2020.01); *G06F 3/0482* (2013.01); *G06F 3/04817* (2013.01)

(58) Field of Classification Search
CPC ...... G06F 3/00; G06F 17/00; G06F 17/30873; G06F 21/6218; G06F 17/3089; G06F 15/00; G06F 3/0481; G06F 3/04817; G06F 3/0482; G06F 16/4387; G06Q 10/10; H04L 67/38

USPC ..................... 715/201, 500.1, 764
See application file for complete search history.

(56) References Cited

U.S. PATENT DOCUMENTS

| | | | |
|---|---|---|---|
| 5,428,730 A | 6/1995 | Baker et al. | |
| 5,699,089 A * | 12/1997 | Murray | G06F 3/033 345/902 |
| 6,202,212 B1 | 3/2001 | Sturgeon et al. | |
| 6,816,870 B1 * | 11/2004 | Nishimura | G06F 3/0338 |
| 7,237,002 B1 * | 6/2007 | Estrada et al. | 709/203 |
| 7,461,343 B2 | 12/2008 | Kates | |
| 7,966,577 B2 | 6/2011 | Chaudhri et al. | |
| 8,201,096 B2 * | 6/2012 | Robert | G06F 3/04817 715/767 |
| 8,429,630 B2 * | 4/2013 | Nickolov | G06F 9/4856 717/110 |

(Continued)

OTHER PUBLICATIONS

"International Search Report & Written Opinion for PCT Application No. PCT/US2013/073918", dated Apr. 23, 2014, Filed Date: Dec. 9, 2013, 9 Pages.

(Continued)

*Primary Examiner* — Justin S Lee

(57) ABSTRACT

A collection environment comprises a collection canvas. The collection canvas may have included therein written text and a file graphic associated with a media file. Responsive to an invocation of the media file, media controls with which to control a media mode associated with the media file are presented. Responsive to a modification to the media mode initiated through the media controls, an appearance of the file graphic is modified to reflect the modification to the media mode.

20 Claims, 3 Drawing Sheets

(56) References Cited

U.S. PATENT DOCUMENTS

| | | | | |
|---|---|---|---|---|
| 8,499,254 | B2* | 7/2013 | Sareen | G06F 9/451 |
| | | | | 715/779 |
| 8,607,166 | B2* | 12/2013 | Jalon | G06F 3/0481 |
| | | | | 715/838 |
| 9,071,615 | B2* | 6/2015 | Sanchez | G06F 9/4443 |
| 9,207,842 | B2* | 12/2015 | Bennetts | G06F 3/04842 |
| 9,275,685 | B2* | 3/2016 | Demarta | G11B 27/102 |
| 2002/0082730 | A1* | 6/2002 | Capps | H04N 21/40 |
| | | | | 700/94 |
| 2003/0090504 | A1* | 5/2003 | Brook | G11B 27/034 |
| | | | | 715/716 |
| 2005/0034148 | A1* | 2/2005 | Jaeger | G06F 3/0481 |
| | | | | 725/14 |
| 2006/0277454 | A1* | 12/2006 | Chen | 715/500.1 |
| 2007/0136679 | A1* | 6/2007 | Yang | H04N 5/44513 |
| | | | | 715/772 |
| 2007/0234308 | A1* | 10/2007 | Feigenbaum | G06F 8/316 |
| | | | | 717/130 |
| 2008/0034325 | A1* | 2/2008 | Ording | G06F 3/04817 |
| | | | | 715/838 |
| 2008/0168381 | A1 | 7/2008 | Nelson et al. | |
| 2009/0292984 | A1* | 11/2009 | Bauchot et al. | 715/234 |
| 2009/0313564 | A1* | 12/2009 | Rottler | G11B 27/105 |
| | | | | 715/764 |
| 2010/0122279 | A1* | 5/2010 | Zhang | H04H 60/59 |
| | | | | 725/19 |
| 2010/0185985 | A1 | 7/2010 | Chmielewski et al. | |
| 2011/0181602 | A1* | 7/2011 | Boda | G06F 9/451 |
| | | | | 345/473 |
| 2011/0231260 | A1* | 9/2011 | Price | G06Q 30/02 |
| | | | | 705/14.61 |
| 2011/0302493 | A1* | 12/2011 | Runstedler | G06F 16/4387 |
| | | | | 715/716 |
| 2012/0066612 | A1 | 3/2012 | Virmani et al. | |
| 2012/0081530 | A1* | 4/2012 | Kerr | G11B 27/34 |
| | | | | 348/61 |
| 2012/0260169 | A1* | 10/2012 | Schwartz | H04L 12/2812 |
| | | | | 715/716 |
| 2012/0323704 | A1* | 12/2012 | Steelberg | G06Q 30/02 |
| | | | | 705/14.73 |
| 2013/0169667 | A1* | 7/2013 | Gardenfors | G09G 5/00 |
| | | | | 345/619 |
| 2014/0068440 | A1* | 3/2014 | Wiltzius | G06F 3/0481 |
| | | | | 715/727 |

OTHER PUBLICATIONS

Apple, Inc.; "Presenting View Controllers from Other View Controllers;" Feb. 16, 2012; pp. 1-8; Apple, Inc.; http://developer.apple.com/library/ios/#featuredarticles/ViewControllerPGforiPhoneOS/ModalViewControllers/ModalViewControllers.html.

* cited by examiner

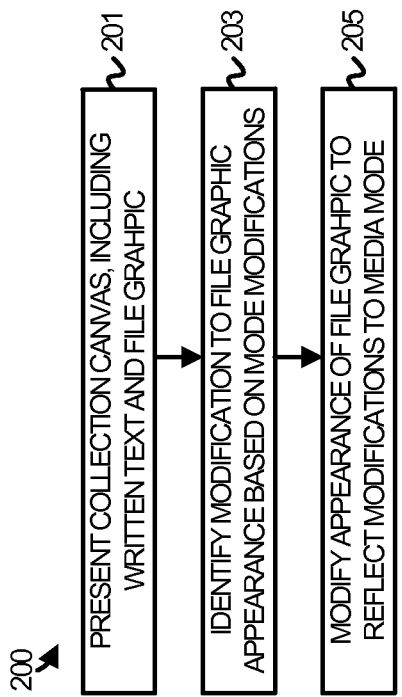
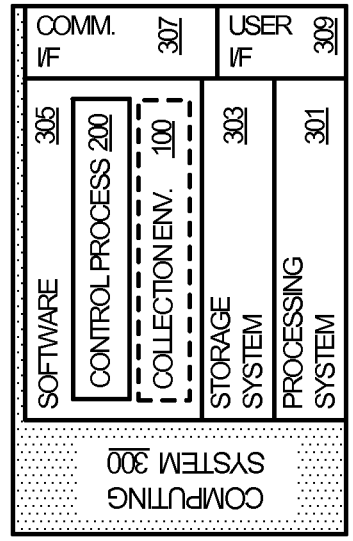
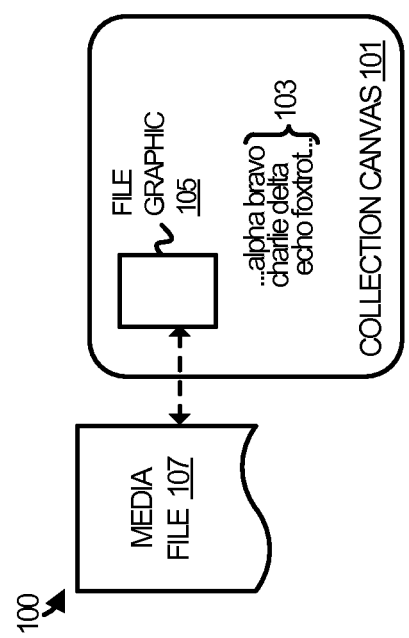

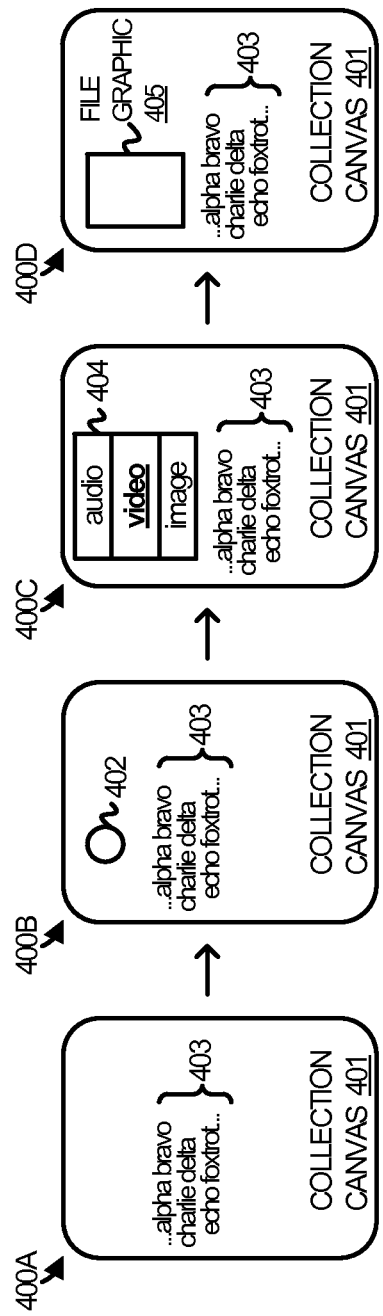

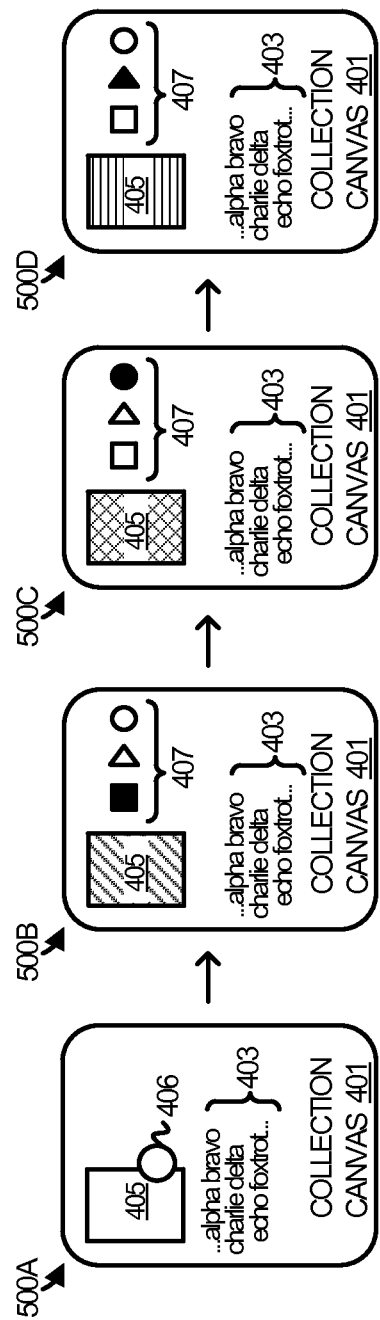

US 10,902,179 B2

MODIFICATION OF FILE GRAPHIC APPEARANCE WITHIN A COLLECTION CANVAS

TECHNICAL FIELD

Aspects of the disclosure are related to computer hardware and software technology, and in particular, to note taking applications and collection environments.

TECHNICAL BACKGROUND

Much like a physical notebook, note taking applications allow notes, photos, and other useful information to be captured and organized for later reference. Many note taking applications also provide recording tools for capturing audio and video presentations. Notes can be indexed along with the other information, such as an audio recording or a web clipping, to allow for synchronized playback and other features.

Many note taking applications provide off-canvas controls for generating and interacting with embedded presentations, such as an audio or video recording. For example, a note taking application may provide a canvas where notes can be taken and a function menu distinct from the canvas through which various recording-related functions can be accessed. To record a presentation, a user navigates the function menus and thus navigates away from the canvas. Even once a recording is made, controls for the recording are also accessed through the function menus. Thus, to stop, play, record, or perform other media-related functions, a user is again drawn away from the canvas.

Some dedicated media applications provide on-canvas controls for controlling media-related functions. For example, a media player may provide media controls presented over the canvas through which a video is viewed. The media controls may persist over the video while it is playing or may be presented in response to user interaction with the video presentation. The user can stop, pause, play, or otherwise interact with the video without having to navigate to a function menu located away from the canvas.

OVERVIEW

Provided herein are systems, methods, and software for facilitating collection environments. In at least one implementation, a collection environment is presented and comprises a collection canvas. The collection canvas may have included therein written text and a file graphic associated with a media file. Responsive to an invocation of the media file, media controls with which to control a media mode associated with the media file are presented. Responsive to a modification to the media mode initiated through the media controls, an appearance of the file graphic is modified to reflect the modification to the media mode.

This Overview is provided to introduce a selection of concepts in a simplified form that are further described below in the Technical Disclosure. It should be understood that this Overview is not intended to identify key features or essential features of the claimed subject matter, nor is it intended to be used to limit the scope of the claimed subject matter.

BRIEF DESCRIPTION OF THE DRAWINGS

Many aspects of the disclosure can be better understood with reference to the following drawings. While several implementations are described in connection with these drawings, the disclosure is not limited to the implementations disclosed herein. On the contrary, the intent is to cover all alternatives, modifications, and equivalents.

FIG. 1 illustrates a collection environment in an embodiment.

FIG. 2 illustrates a control process in an implementation.

FIG. 3 illustrates a computing system in an implementation.

FIG. 4 illustrates a sequence of views pertaining to the operation of a collection environment in an implementation.

FIG. 5 illustrates a sequence of views pertaining to the operation of a collection environment in an implementation.

TECHNICAL DISCLOSURE

Implementations described herein provide for the improved navigation and control of collection environments. In one implementation, a note taking application presents a canvas having written text and a file graphic embedded therein. The file graphic may be associated with a media file generated while taking notes embodied in the written text. Upon invoking the media file, such as by touching, clicking on, or otherwise selecting the file graphic by way of a user input, the application presents media controls with which to control the media file. In response to a modification of the media mode, the application modifies the appearance of the file graphic to reflect the modification to the media mode.

For example, upon invoking a media file, media controls including a stop, play, and record controls may be displayed on the canvas, along with the file graphic corresponding to the media file and any written text or other notes taken by a user. The user may then interact with the media controls to control the behavior of the media file, such as by pressing stop, play, or record. In addition, the appearance of the file marker changes as the mode of the media file changes. The file graphic may take on one appearance while stopped, another while playing, and yet another while recording. For example, a variety of different aesthetics may be employed with respect to the appearance of the file graphic in order to communicate the state or mode of a corresponding media file. In some scenarios a mildly transparent aesthetic, a saturated aesthetic, and a solid aesthetic may be employed to represent the various states or modes of a media file.

FIG. 1 illustrates a collection environment 100 in one implementation. Collection environment 100 includes collection canvas 101, written text 103, and file graphic 105. File graphic 105 is associated with media file 107. Collection environment 100 may be any environment in which various kinds of information in various formats may be collected on collection canvas 101. Examples of information that may be collected include typed written text, handwritten text, audio recordings, video recordings, images, website clippings, a document presentation recording, slide show recordings, spreadsheet tables, screen clippings, attached files, scanner results, and date and time information, as well as any other suitable information or collected items.

Collection environment 100 may be rendered by executing a dedicated note taking application, such as Microsoft® OneNote®. However, collection environment 100 may also be rendered by other types of productivity applications, such as dedicated word processing, spreadsheet, presentation, or publishing applications. Collection environment 100 may also be rendered by executing other types of applications, such as operating system utilities and components, gaming applications, embedded applications, communication applications, or any other type of program capable of collecting and presenting various kinds of information in various formats.

FIG. 2 illustrates a control process 200 or method for operating a computing system to control various aspects of collection environment 100. To begin, collection environment 100 is presented, including collection canvas 101 with written text 103 and file graphic 105 embedded therein (step 201). Responsive to a modification to media file 107, which corresponds to file graphic 105, a modification to an appearance of file graphic 105 is identified (step 203). The appearance of file graphic 105 can then be modified to reflect the modification to the media file (step 205).

While control process 200 generally refers to presenting a collection canvas, identifying a modification to the appearance of a file graphic, and modifying the appearance of the file graphic accordingly, variations of control process 200 are possible. For example, a variation of control process 200 may involve initiating each of the aforementioned steps, in addition to or in place of actually performing each of the aforementioned steps. For example, a variation of control process 200 may include some or all of initiating the presentation of a collection canvas, initiating the identification of a modification to the appearance of a file graphic, and initiating a modification to the appearance of the file graphic accordingly. Another variation of control process 200 may include other steps in addition to or in place of those discussed above. For instance, a variation of control process 200 may include, responsive to an invocation of the media file, presenting a media controls with which to control a media mode associated with the media file or initiating the same.

Computing system 300, referred to in FIG. 3, may be representative of any computing apparatus, system, or systems on which control process 200 or variations thereof may be suitably implemented. Optionally, computing system 300 may also be suitable for implementing all of or portions of collection environment 100. Implementing control process 200 or variations thereof may include local execution, streaming execution, or hosted execution of control process 200, or any combination or variation thereof. Examples of computing system 300 include mobile computing devices, desktop computers, cell phones, tablet computers, laptop computers, notebook computers, media devices, and gaming devices, as well as any other type of mobile computing devices and any combination or variation thereof. Examples of computing system 300 also include server computers, cloud computing platforms, and virtual machines, as well as any other type of computing system, variation, or combination thereof.

Computing system 300 includes processing system 301, storage system 303, software 305, communication interface 307, and user interface 309. Processing system 301 is operatively coupled with storage system 303, communication interface 307, and user interface 309. Processing system 301 loads and executes software 305 from storage system 303. When executed by computing system 300 in general, and processing system 301 in particular, software 305 directs computing system 300 to operate as described herein for control process 200 or variations thereof. Computing system 300 may optionally include additional devices, features, or functionality not discussed here for purposes of brevity.

Referring still to FIG. 3, processing system 301 may comprise a microprocessor and other circuitry that retrieves and executes software 305 from storage system 303. Processing system 301 may be implemented within a single processing device but may also be distributed across multiple processing devices or sub-systems that cooperate in executing program instructions. Examples of processing system 301 include general purpose central processing units, application specific processors, and logic devices, as well as any other type of processing device, combinations, or variations thereof.

Storage system 303 may comprise any computer readable storage media readable by processing system 301 and capable of storing software 305. Storage system 303 may include volatile and nonvolatile, removable and non-removable media implemented in any method or technology for storage of information, such as computer readable instructions, data structures, program modules, or other data. Examples of storage media include random access memory, read only memory, magnetic disks, optical disks, flash memory, virtual memory and non-virtual memory, magnetic cassettes, magnetic tape, magnetic disk storage or other magnetic storage devices, or any other suitable storage media. In no case is the storage media a propagated signal. In addition to storage media, in some implementations storage system 303 may also include communication media over which software 305 may be communicated. Storage system 303 may be implemented as a single storage device but may also be implemented across multiple storage devices or sub-systems co-located or distributed relative to each other. Storage system 303 may comprise additional elements, such as a controller, capable of communicating with processing system 301.

Software 305 may be implemented in program instructions and among other functions may, when executed by computing system 300 in general or processing system 301 in particular, direct computing system 300 or processing system 301 to operate as described herein for control process 200. Software 305 may include additional processes, programs, or components, such as operating system software or other application software. Software 305 may also comprise firmware or some other form of machine-readable processing instructions executable by processing system 301.

In general, software 305 may, when loaded into processing system 301 and executed, transform computing system 300 overall from a general-purpose computing system into a special-purpose computing system customized to facilitate collection environments as described herein for each implementation. Indeed, encoding software 305 on storage system 303 may transform the physical structure of storage system 303. The specific transformation of the physical structure may depend on various factors in different implementations of this description. Examples of such factors may include, but are not limited to the technology used to implement the storage media of storage system 303 and whether the computer-storage media are characterized as primary or secondary storage.

For example, if the computer-storage media are implemented as semiconductor-based memory, software 305 may transform the physical state of the semiconductor memory when the program is encoded therein, such as by transforming the state of transistors, capacitors, or other discrete circuit elements constituting the semiconductor memory. A similar transformation may occur with respect to magnetic or optical media. Other transformations of physical media are possible without departing from the scope of the present description, with the foregoing examples provided only to facilitate this discussion.

It should be understood that computing system 300 is generally intended to represent a computing system with which software 305 is deployed and executed in order to implement control process 200 (and variations thereof) and optionally all or portions of collection environment 100. However, computing system 300 may also represent any computing system on which software 305 may be staged and from where software 305 may be distributed, transported, downloaded, or otherwise provided to yet another computing system for deployment and execution, or yet additional distribution.

Referring again to FIG. 1, through the operation of computing system 300 employing software 305, transformations may be performed with respect to collection environment 100. As an example, collection environment 100 could be considered transformed from one state to another when subject to control process 200 or variations thereof. In a first state, computing system 300 may render collection canvas 101 with written text 103 and file graphic 105 embedded therein. Responsive to a modification made to media file 107 or a media mode associated therewith, the appearance of file graphic 105 is modified, thereby changing collection environment 100 to a second, different state.

Referring again to FIG. 3, communication interface 307 may include communication connections and devices that allow for communication between computing system 300 and other computing systems (not shown) over a communication network or collection of networks (not shown). Examples of connections and devices that together allow for inter-system communication may include network interface cards, antennas, power amplifiers, RF circuitry, transceivers, and other communication circuitry. The connections and devices may communicate over communication media to exchange communications with other computing systems or networks of systems, such as metal, glass, air, or any other suitable communication media. The aforementioned communication media, network, connections, and devices are well known and need not be discussed at length here.

User interface 309 may include a mouse, a voice input device, a touch input device for receiving a touch gesture from a user, a motion input device for detecting non-touch gestures and other motions by a user, and other comparable input devices and associated processing elements capable of receiving user input from a user. Output devices such as a display, speakers, haptic devices, and other types of output devices may also be included in user interface 309. In some cases, the input and output devices may be combined in a single device, such as a display capable of displaying images and receiving touch gestures. The aforementioned user input and output devices are well known in the art and need not be discussed at length here. User interface 309 may also include associated user interface software executable by processing system 301 in support of the various user input and output devices discussed above. Separately or in conjunction with each other and other hardware and software elements, the user interface software and devices may provide a graphical user interface, a natural user interface, or any other kind of user interface.

FIG. 4 illustrates several sequential views 400A-D illustrating the operation of a collection canvas 401 within a collection environment. FIG. 5 also illustrates several sequential views 500A-D illustrating the operation of collection canvas 401 within collection environment. Views 500A-D may be considered sequential to views 400A-D, but may also be considered as occurring separately from views 400A-D. It may also be appreciated that the operations illustrated in FIG. 4 and FIG. 5 may occur in an order differing from that illustrated in either figure.

Collection canvas 401 may be rendered and the illustrated operations carried out when executing a dedicated note taking application, such as Microsoft® OneNote®. However, collection canvas 401 and the illustrated operations may also be implemented by other types of productivity applications, such as dedicated word processing, spreadsheet, presentation, or publishing applications. Collection canvas 401 and the illustrated operations may also be implemented by executing other types of applications, such as operating system utilities and components, gaming applications, embedded applications, communication applications, or any other type of program capable of collecting and presenting various kinds of information in various formats. Computing system 300 is representative of a computing system suitable for implementing collection canvas 401 and the related operations illustrated in FIG. 4 and FIG. 5.

Collection canvas 401 may be suitable for collecting various kinds of information in various formats. Examples of information that may be collected include typed written text, hand-written text, audio recordings, video recordings, images, website clippings, a document presentation recording, slide show recordings, spreadsheet tables, screen clippings, attached files, scanner results, and date and time information, as well as any other suitable information or collected items.

Referring now to FIG. 4, In view 400A, collection canvas 401 includes written text 403. View 400A refrains from illustrating other information in addition to written text 403 for the sake of clarity, although it other information is possible and may be considered within the scope of the present disclosure. View 400A may be representative of an early stage of interaction with collection canvas 401 by a user prior to generating a recording of some sort.

In view 400B, a user input 402 occurs and is directed to an insertion point on collection canvas 401 above written text 403. User input 402 may be a touch gesture, a multi-touch gesture, a mouse click, or some other suitable user input indicative of an intention to insert media in or around the insertion point.

Responsive to user input 402, an insertion menu 404 is presented on collection canvas 401, as illustrated in view 400C. Insertion menu 404 provides three options for inserting media, including audio, video, and image options. Insertion menu 404 could include additional, different, or fewer options, which may be considered within the scope of the present disclosure. It is assumed for exemplary purposes that the video option is selected from insertion menu 404 as indicated by its bold and underlined font. The video option may be selected from insertion menu 404 by way of any suitable user input mechanism, such as a touch gesture, multi-touch gesture, mouse click, or any other suitable technique.

In view 400D, upon having selected the video option, a file graphic 405 is inserted at or nearby the insertion point earlier indicated by user input 402. File graphic 405 corresponds to a media file (not shown) that is created for purposes of recording video. The video may be recorded to the media file for a variety of purposes, such as storage, playback, editing, and the like. Moving forward, a user may now interact with collection canvas 401 with file graphic 405 conveniently positioned near written text 403, although file graphic 405 could be positioned or repositioned to other positions on collection canvas 401.

Referring now to FIG. 5, views 500A-D illustrated how modifications to the appearance of file graphic 405 can correspond to modifications to the media mode associated with the media file associated with file graphic 405. In view 500A collection canvas 401 includes written text 403 and file graphic 405 embedded therein. A user input 406 occurs which triggers the presentation of media controls 407 in view 500B. The user input 406 may be a touch gesture, multi-touch gesture, mouse click, or any other suitable type of user input or technique indicative of an intention to launch media controls 407. Media controls 407 may be considered to be embedded in collection canvas 401. A non-modal dialog graphic may be used to implement media controls 407 or any other suitable user-interactive tool.

In addition to media controls 407, the appearance of file graphic in view 500B differs its appearance in view 500A. Similarly, the appearance of file graphic 405 in view 500C differs from its appearance in view 500B, and its appearance in view 500D differs relative to that in view 500C. In particular, the initial aesthetic of file graphic 405 in each view differs from the subsequent aesthetic of file graphic 405 in each subsequent view. The initial aesthetic corresponds to an initial state of the media mode associated with the media file represented by file graphic 405, while the subsequent aesthetic corresponds to a subsequent state of the media mode.

For example, in view 500A, media controls 407 have yet to be surfaced. As such, file graphic 405 has not yet taken on a specific aesthetic. However, launch media controls 407 changes the aesthetic of file graphic 405, as is illustrated by the diagonal fill of file graphic 405. The diagonal fill is used merely for exemplary purposes and it may be understood that other types of aesthetics are possible and are within the scope of the present disclosure. In view 500B, the stop control is selected, possibly by default, and may be considered to correspond to the diagonal fill. The stop control corresponds to a stopped media mode. In other words, the state of the media file is in a stopped state.

As operations proceed, others of media controls 407 may be selected, thereby causing a change in the appearance of file graphic 405. For example, in view 500C, the record control has been selected from media controls 407 causing the appearance of file graphic 405 to change to a cross hatch fill. The cross hatch fill is used merely for exemplary purposes and it may be understood that other types of aesthetics are possible and are within the scope of the present disclosure. The record control corresponds to a recording media mode. In other words, when record control is selected, recording is occurring and video (or other types of media) is being recorded to the media file associated with file graphic 405.

In view 500D, another media control has been selected causing another change in the media mode associated with the media file, and thus another change to the appearance of file graphic 405. In this view, the play control has been selected from media controls 407 causing the appearance of file graphic 405 to change to a horizontal fill. The horizontal fill is used merely for exemplary purposes and it may be understood that other types of aesthetics are possible and are within the scope of the present disclosure. The play control corresponds to a playing media mode. In other words, when the play control is selected, the video or other media is being played out from the media file associated with file graphic 405.

As mentioned, a variety of different aesthetics may be employed with respect to the appearance of file graphic 405 in order to communicate the state or mode of a corresponding media file. For example, a mildly transparent aesthetic, a saturated aesthetic, and a solid aesthetic may be employed to represent the various states of a media file.

The functional block diagrams, operational sequences, and flow diagrams provided in the Figures are representative of exemplary architectures, environments, and methodologies for performing novel aspects of the disclosure. While, for purposes of simplicity of explanation, methods included herein may be in the form of a functional diagram, operational sequence, or flow diagram, and may be described as a series of acts, it is to be understood and appreciated that the methods are not limited by the order of acts, as some acts may, in accordance therewith, occur in a different order and/or concurrently with other acts from that shown and described herein. For example, those skilled in the art will understand and appreciate that a method could alternatively be represented as a series of interrelated states or events, such as in a state diagram. Moreover, not all acts illustrated in a methodology may be required for a novel implementation.

The included descriptions and figures depict specific implementations to teach those skilled in the art how to make and use the best mode. For the purpose of teaching inventive principles, some conventional aspects have been simplified or omitted. Those skilled in the art will appreciate variations from these implementations that fall within the scope of the invention. Those skilled in the art will also appreciate that the features described above can be combined in various ways to form multiple implementations. As a result, the invention is not limited to the specific implementations described above, but only by the claims and their equivalents.

What is claimed is:

1. One or more computer readable storage media having program instructions stored thereon for facilitating collection environments that, when executed by a computing system, direct the computing system to at least:
    enable presentation of a collection environment comprising a collection canvas having included therein written text and a file graphic representative of a media file;
    responsive to receiving a selection of the file graphic, enable presentation of a plurality of media controls with which to control a media mode associated with the media file, wherein the plurality of media controls comprises at least three media controls;
    responsive to receiving a selection of one of the plurality of media controls, modify an appearance of the file graphic from an initial aesthetic having one of a plurality of aesthetics to a subsequent aesthetic having a different one of the plurality of aesthetics;
    wherein each aesthetic of the plurality of aesthetics corresponds to a different control of the plurality of controls; and
    wherein each aesthetic of the plurality of aesthetics is unique relative to each other of the plurality of aesthetics.

2. The one or more computer readable storage media of claim 1 wherein the initial aesthetic corresponds to an initial state of the media mode and wherein the subsequent aesthetic corresponds to a subsequent state of the media mode.

3. The one or more computer readable storage media of claim 1 wherein the plurality of media controls comprises a play control, a stop control, and a record control.

4. The one or more computer readable storage media of claim 1 wherein the plurality of aesthetics comprises a mildly transparent aesthetic, a saturated aesthetic, and a solid aesthetic.

5. The one or more computer readable storage media of claim 2 wherein the initial state comprises a recording state and wherein the subsequent state comprises a stopped state.

6. The one or more computer readable storage media of claim 2 wherein the initial state comprises a stopped state and wherein the subsequent state comprises a playing state.

7. The one or more computer readable storage media of claim 1 wherein, to enable presentation of the plurality of media controls, the program instructions direct the computing system to enable presentation of a non-modal dialog graphic comprising the plurality of media controls, and wherein the collection canvas comprises a canvas having the file graphic embedded therein and having the non-modal dialog graphic embedded therein.

8. The one or more computer readable storage media of claim 1 wherein the program instructions further direct the computing system to, responsive to receiving a selection of one of the plurality of media controls, modify a state of the media mode.

9. A method of operating a computing system to facilitate collection environments, the method comprising:
 initiating presentation of a collection environment comprising a collection canvas having written text and a file graphic embedded therein;
 responsive to receiving a selection of the file graphic, initiating presentation of a plurality of media controls with which to control a media mode associated with a media file;
 responsive to receiving a selection of one of the plurality of media controls, identifying a modification to an appearance of the file graphic from an initial aesthetic having one of a plurality of aesthetics to a subsequent aesthetic having a different one of the plurality of aesthetics, wherein each aesthetic of the plurality of aesthetics comprises a fill that corresponds to a different control of the plurality of controls; and
 initiating presentation of the modification to the appearance of the file graphic.

10. The method of claim 9 further comprising, initiating modification to the media mode through the plurality of media controls.

11. The method of claim 9 wherein initiating presentation of the plurality of media controls comprises presenting a non-modal dialog graphic comprising the plurality of media controls, and wherein the collection canvas comprises a canvas having the file graphic embedded therein and having the non-modal dialog graphic embedded therein.

12. The method of claim 9 wherein the initial aesthetic corresponds to an initial state of the media mode and wherein the subsequent aesthetic corresponds to a subsequent state of the media mode.

13. The method of claim 9 wherein the plurality of media controls comprises a play control, a stop control, and a record control.

14. The method of claim 9 wherein the plurality of aesthetics comprises a mildly transparent aesthetic, a saturated aesthetic, and a solid aesthetic.

15. The method of claim 12 wherein the initial state comprises a recording state and wherein the subsequent state comprises a stopped state.

16. The method of claim 12 wherein the initial state comprises a stopped state and wherein the subsequent state comprises a playing state.

17. A computing apparatus comprising:
 one or more computer readable storage media, and
 program instructions stored on the one or more computer readable storage media, wherein the program instructions, when executed by a processing system, direct the processing system to at least:
 initiate presentation of a collection canvas having embedded therein written text and a file graphic representative of a media file;
 responsive to receiving a selection of the file graphic, initiate presentation of a plurality of media controls with which to control a media mode associated with the media file;
 responsive to a modification to a state of the media mode from an initial state of the media mode to a subsequent state of the media mode, identify a modification to an appearance of the file graphic from an initial aesthetic having one of a plurality of aesthetics to a subsequent aesthetic having a different one of the plurality of aesthetics, wherein each aesthetic of the plurality of aesthetics comprises a fill that corresponds to a different control of the plurality of controls; and
 initiate presentation of the modification to the appearance of the file graphic.

18. The computing apparatus of claim 17 further comprising the processing system coupled with the one or more computer readable storage media and configured to execute the program instructions, and further comprising a computer readable communication media over which to communicate the program instructions to the computer readable storage media.

19. The computing apparatus of claim 17 wherein the initial state comprises a recording state and wherein the subsequent state comprises a stopped state.

20. The computing apparatus of claim 19 wherein the plurality of aesthetics comprises a mildly transparent aesthetic, a saturated aesthetic, and a solid aesthetic.

\* \* \* \* \*